United States Patent
Ince et al.

(10) Patent No.: US 9,816,567 B2
(45) Date of Patent: Nov. 14, 2017

(54) WEDGE CLUTCH WITH MUTUALLY SUPPORTING WEDGE PLATES AND SELF-LOCKING DISPLACEMENT ASSEMBLY

(71) Applicant: Schaeffler Technologies AG & Co. KG, Herzogenaurach (DE)

(72) Inventors: Marion Jack Ince, Mount Holly, NC (US); Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/019,571

(22) Filed: Feb. 9, 2016

(65) Prior Publication Data
US 2017/0227064 A1    Aug. 10, 2017

(51) Int. Cl.
| | | |
|---|---|---|
| F16D 15/00 | (2006.01) | |
| F16D 13/26 | (2006.01) | |
| F16D 13/58 | (2006.01) | |
| F16D 121/14 | (2012.01) | |

(52) U.S. Cl.
CPC ............ *F16D 13/26* (2013.01); *F16D 13/58* (2013.01); *F16D 13/583* (2013.01); *F16D 15/00* (2013.01); *F16D 2121/14* (2013.01)

(58) Field of Classification Search
USPC .......................................................... 192/65
See application file for complete search history.

(56) References Cited

U.S. PATENT DOCUMENTS

| | | | | |
|---|---|---|---|---|
| 1,338,298 A | * | 4/1920 | Hansen | F16D 13/12 |
| | | | | 192/65 |
| 2,382,869 A | * | 8/1945 | Fisher | F16D 17/00 |
| | | | | 192/114 R |
| 2,883,024 A | * | 4/1959 | Emrick | F16D 15/00 |
| | | | | 192/45.1 |
| 2014/0110207 A1 | | 4/2014 | Davis | |
| 2015/0027840 A1 | * | 1/2015 | Lee | F16D 13/16 |
| | | | | 192/45.1 |
| 2015/0083539 A1 | | 3/2015 | Lee et al. | |

* cited by examiner

*Primary Examiner* — Mark A Manley

(57) ABSTRACT

A wedge clutch, including: a shaft; a hub radially disposed about the shaft; an outer ring located radially outward of the hub; a wedge plate radially disposed between the hub and the outer ring; and a displacement assembly including a first element and a plunger assembly at least partly disposed within the hub. To transition from a disconnect mode to a connect mode, the displacement assembly is arranged to displace the hub in a second axial direction and a portion of the plunger assembly is arranged to displace radially inward to block axial displacement of the hub in the first axial direction. To transition from the connect mode to the disconnect mode, the portion of the plunger assembly is arranged to displace radially outward through the hub and the first element is arranged to displace the hub in the first axial direction.

18 Claims, 9 Drawing Sheets

WEDGE CLUTCH WITH MUTUALLY SUPPORTING WEDGE PLATES AND SELF-LOCKING DISPLACEMENT ASSEMBLY

TECHNICAL FIELD

Described herein is a wedge clutch with a self-locking displacement assembly. In particular, the assembly is able to maintain the wedge clutch in a connect (closed) mode without the application of external force, for example by an actuator.

BACKGROUND

During a connect (closed) mode for known wedge clutches having a hub with a radially sloping surface for contacting the wedge plate, compressive forces, due to the transmission of torque through the clutch, urge the wedge plate to slip down the radially sloping surface, which tends to axially displace the hub with respect to the wedge plate and open the clutch, reducing reliability and torque-carrying capacity of the wedge clutch. An actuator can be used to apply axial force to the hub to maintain the axial position of the hub. However, the actuator must be powered by the vehicle in which the wedge clutch is located, which reduces the amount of power available for other components in the vehicle and the overall efficiency of the wedge clutch and vehicle.

SUMMARY

According to aspects illustrated herein, there is provided a wedge clutch, including: an axis of rotation; a shaft; a hub radially disposed about the shaft; an outer ring located radially outward of the hub; a wedge plate radially disposed between the hub and the outer ring; and a displacement assembly including a first element urging the hub in a first axial direction and a plunger assembly, at least a portion of which is disposed within the hub. To transition from a disconnect mode for the wedge clutch, in which the hub and the outer ring are rotatable with respect to each other, to a connect mode for the wedge clutch, in which the hub and the outer ring are non-rotatably connected, the displacement assembly is arranged to displace the hub in a second axial direction, opposite the first axial direction and at least a portion of the plunger assembly is arranged to displace radially inward, through the hub, in a first radial direction to block axial displacement of the hub in the first axial direction. To transition from the connect mode to the disconnect mode, the at least a portion of the plunger assembly is arranged to displace radially outward, through the hub, in a second radial direction and the first element is arranged to displace the hub in the first axial direction.

According to aspects illustrated herein, there is provided a wedge clutch, including: an axis of rotation; a hub; an outer ring located radially outward of the hub; a wedge plate radially disposed between the hub and the outer ring; and a displacement assembly including a first element urging the hub in a first axial direction, an actuator, a slider ring and a plunger assembly, including a plunger, at least a portion of which is disposed within the hub. To transition from a disconnect mode for the wedge clutch, in which the hub and the outer ring are rotatable with respect to each other, to a connect mode for the wedge clutch, in which the hub and the outer ring are non-rotatably connected, the actuator is arranged to displace the slider ring in a second axial direction, opposite the first axial direction, the slider ring is arranged to displace the hub in the second axial direction and the slider ring is arranged to displace the plunger radially inward, through the hub, in a first radial direction. In the connect mode: the slider ring is arranged to block displacement of the plunger radially outward in a second radial direction; and the plunger is arranged to block displacement of the hub in the first axial direction. To transition from the connect mode to the disconnect mode: the actuator is arranged to displace the slider ring in the first axial direction; the plunger is arranged to displace radially outward, through the hub, in the second radial direction; and the first element is arranged to displace the hub in the first axial direction.

According to aspects illustrated herein, there is provided a wedge clutch, including: an axis of rotation; a shaft; a hub non-rotatably connect to the shaft; an outer ring located radially outward of the hub; a wedge plate radially disposed between the hub and the outer ring; and a displacement assembly including a first element urging the hub in a first axial direction, an actuator, a slider ring and a plunger assembly including a plunger, at least a portion of which is disposed within the hub and a spring urging the plunger radially outward. To transition from a disconnect mode for the wedge clutch, in which the hub and the outer ring are rotatable with respect to each other, to a connect mode for the wedge clutch, in which the hub and the outer ring are non-rotatably connected, the actuator is arranged to displace the slider ring in a second axial direction, opposite the first axial direction, the slider ring is arranged to displace the hub in the second axial direction and the slider ring is arranged to displace the plunger radially inward, through the hub. In the connect mode: the slider ring is arranged to block displacement of the plunger radially outward in a second radial direction; and the plunger is arranged to block displacement of the hub, with respect to the shaft, in the first axial direction. To transition from the connect mode to the disconnect mode: the actuator is arranged to displace the slider ring in the first axial direction; the spring is arranged to displace the plunger radially outward, through the hub; and the first element is arranged to displace the hub in the first axial direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
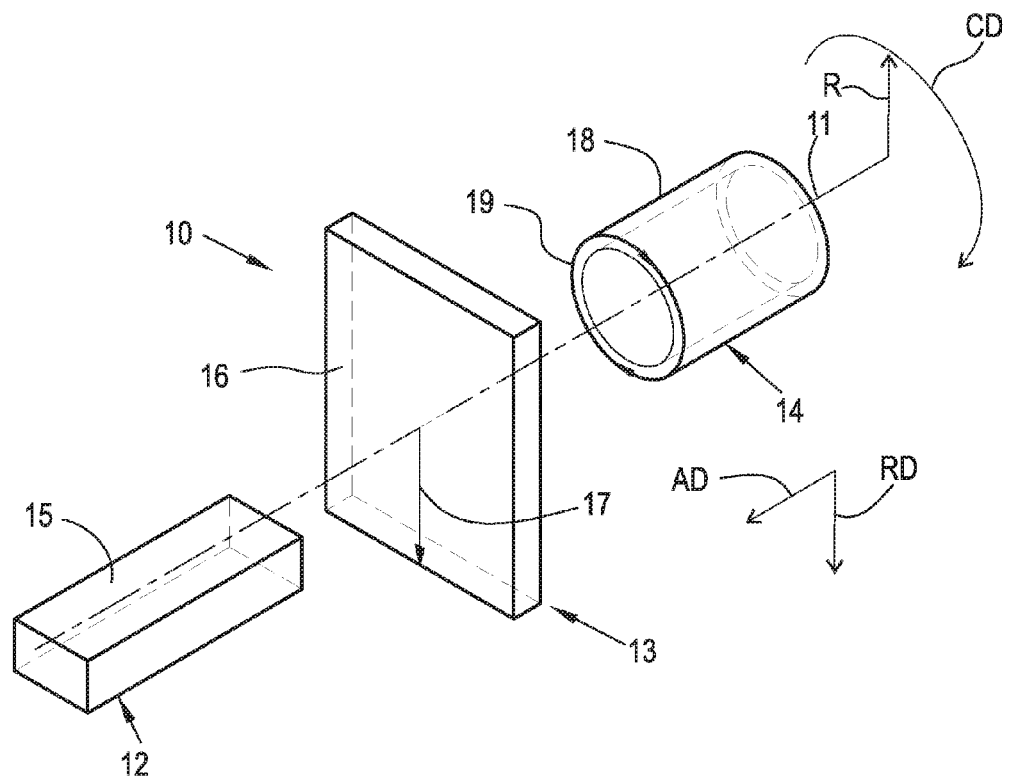
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially", "radially", and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
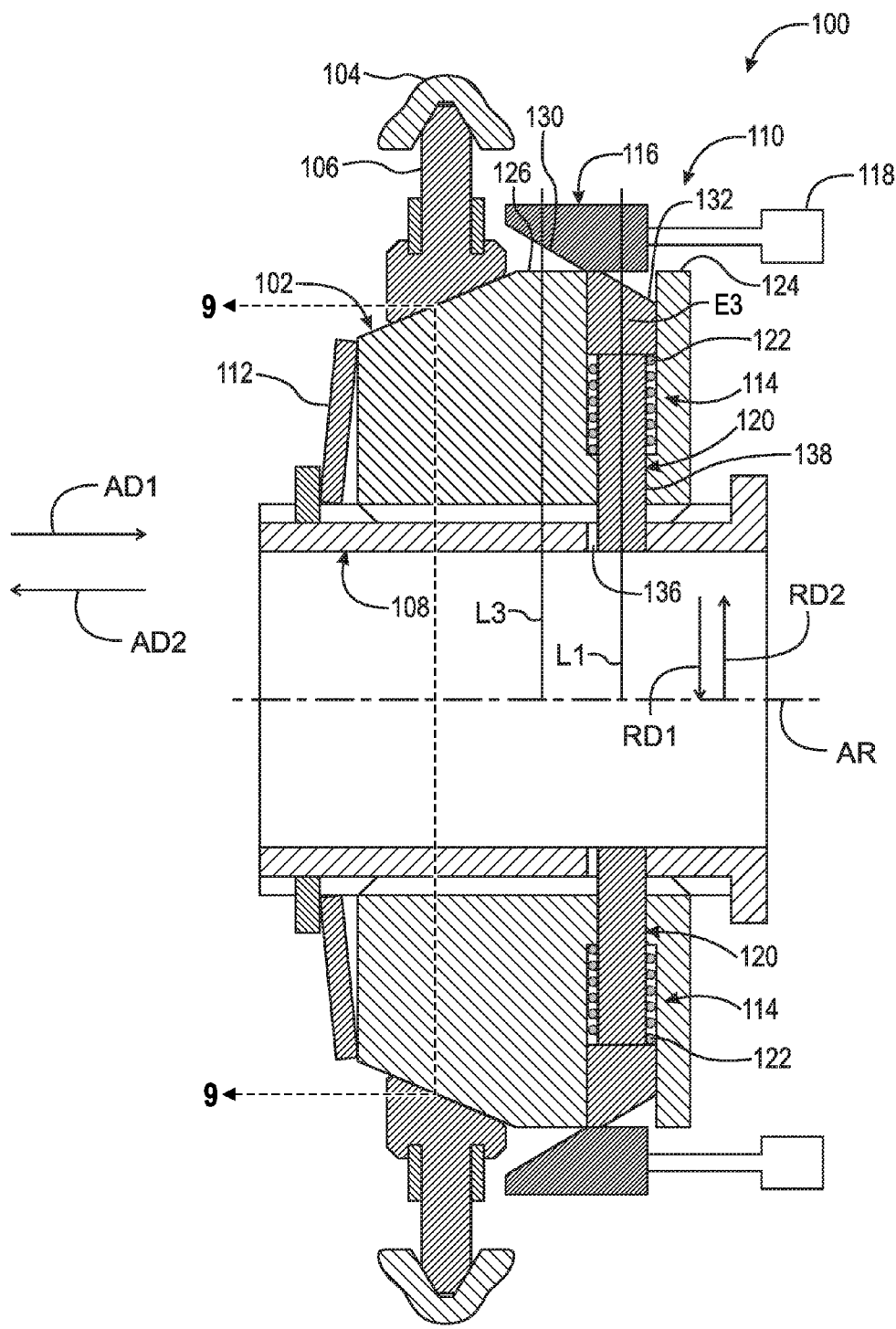
FIG. 2 is a cross-sectional view of a wedge clutch with a self-locking connect mode, in the connect mode.

FIG. 2 is a cross-sectional view of wedge clutch 100 with a self-locking connect mode, in the connect mode. Wedge clutch 100 includes: axis of rotation AR; hub 102; outer ring 104 located radially outward of hub 102; wedge plate 106; shaft 108; and displacement assembly 110. Wedge plate 106 is radially disposed between hub 102 and outer ring 104. In an example embodiment, assembly 110 includes element 112 urging hub 102 in axial direction AD1, and plunger assembly 114. In an example embodiment, element 112 is a resilient element. By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

Figure 3:
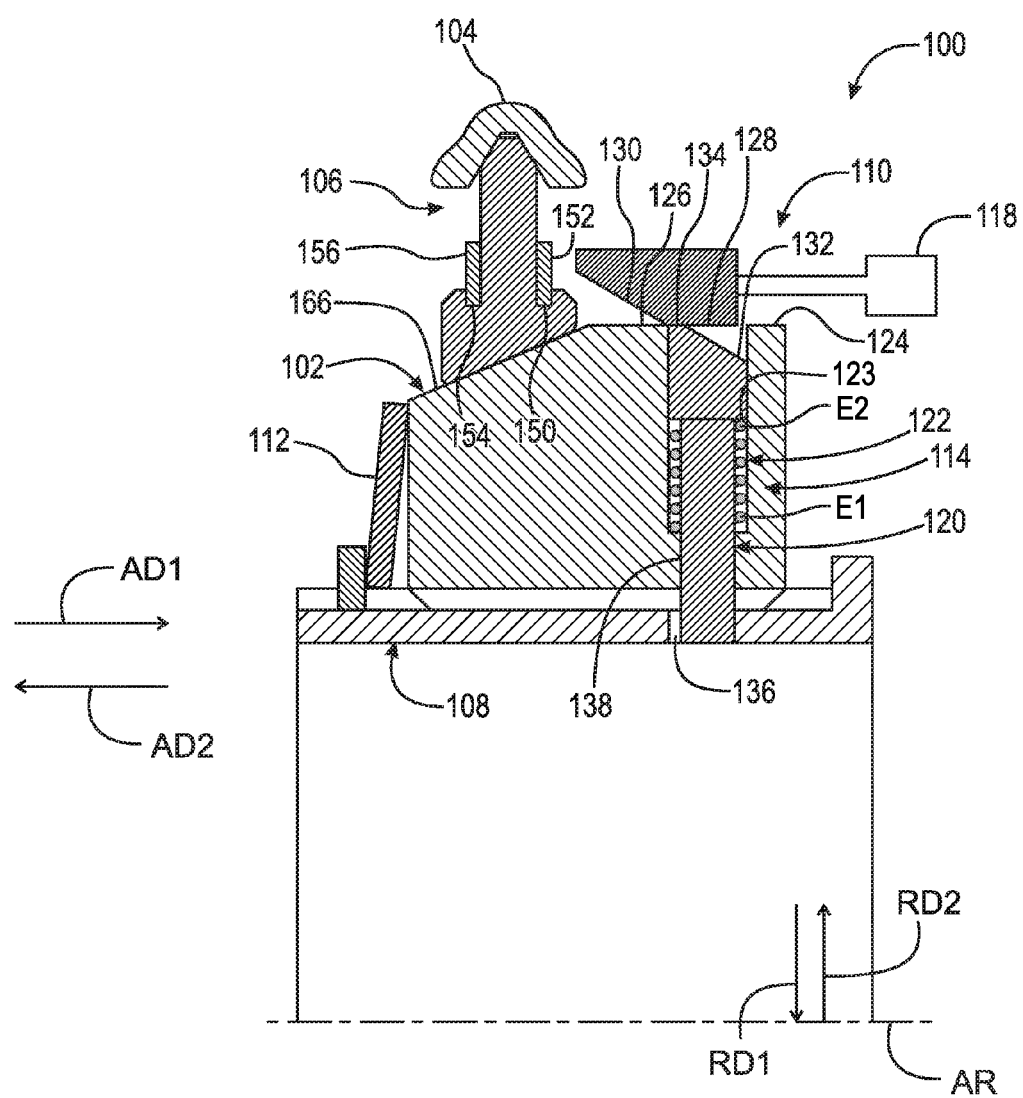
FIG. 3 is a partial cross-sectional view of the wedge clutch in FIG. 2.

FIG. 3 is a partial cross-sectional view of wedge clutch 100 in FIG. 2.

Figure 4:
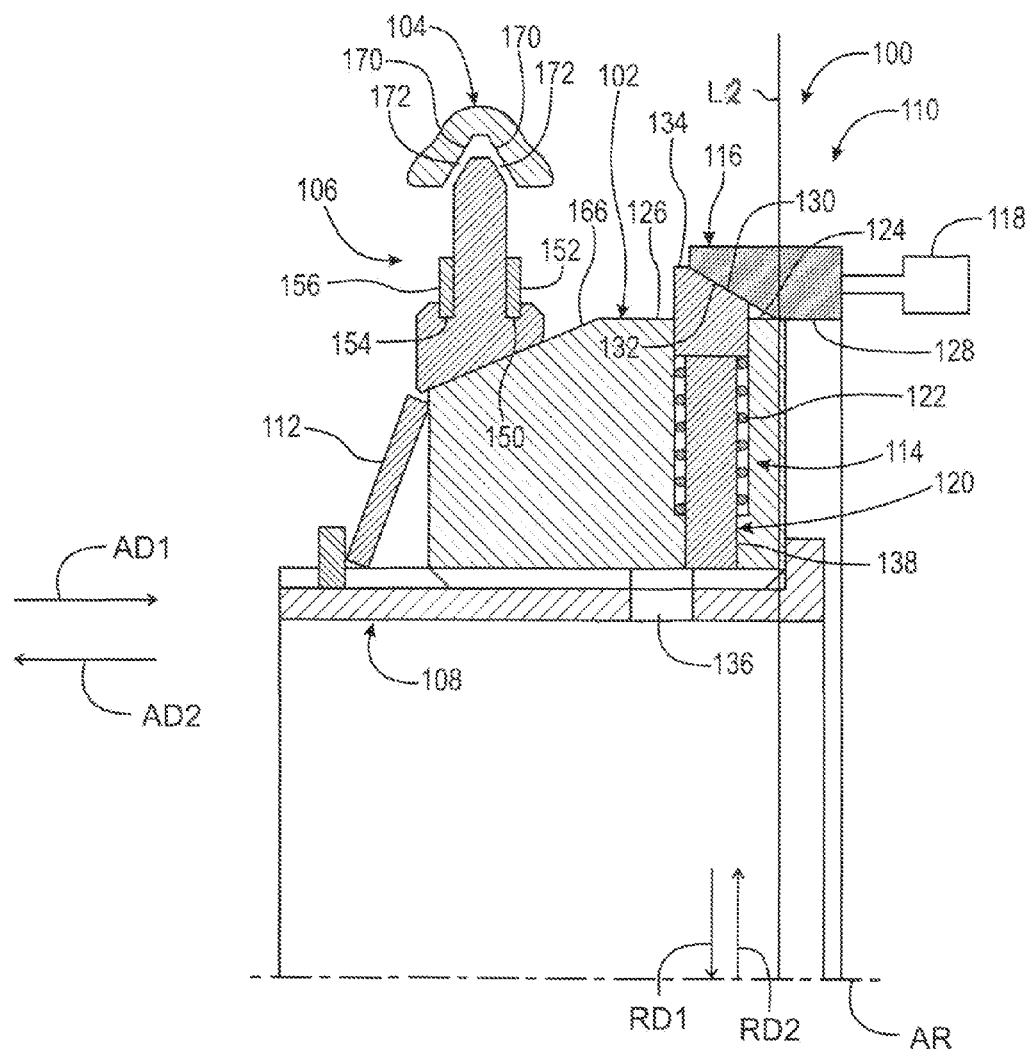
FIG. 4 is a partial cross-sectional view of the wedge clutch in FIG. 2 in a disconnect mode.

FIG. 4 is a partial cross-sectional view of wedge clutch 100 in FIG. 2 in a disconnect mode. The following should be viewed in light of FIGS. 2 through 4. To transition from a disconnect mode for wedge clutch 100, in which hub 102 and outer ring 104 are rotatable with respect to each other, to a connect mode for wedge clutch 100, in which hub 102 and the outer ring 104 are non-rotatably connected: displacement assembly 110 is arranged to displace hub 102 in axial direction AD2, opposite axial direction AD1; and at least a portion of plunger assembly 114 is arranged to displace radially inward, through hub 102, in radial direction RD1, to block axial displacement of hub 102 in axial direction AD1. To transition from the connect mode to the disconnect mode: the at least a portion of plunger 114 is arranged to displace radially outward, through hub 102, in radial direction RD2, opposite direction RD1; and element 112 is arranged to displace hub 102 in axial direction AD1.

In an example embodiment, plunger assembly 114 is non-rotatably connected to hub 102 and displacement assembly 110 includes: slider ring 116 radially disposed about at least a portion of hub 102; and actuator 118. In an example embodiment, assembly 114 includes plunger 120 and spring 122 urging plunger 120 in radial direction RD2. End E1 of spring 122 is engaged with hub 102 and end E2 of spring 122 is engaged with plunger 120, for example with shoulder 123. To transition from the disconnect mode to the connect mode: actuator 118 is arranged to slide slider ring 116 along plunger 120 in axial direction AD2; and slider ring 116 is arranged to displace plunger 120 in direction RD1. In the connect mode, actuator 118 can be deactivated. That is, ring 116 and assembly 114 maintain hub 102 in the required connect mode position (block displacement of hub 102 in direction AD1) without the need for actuator 118. In the connect mode: slider ring 116 is radially aligned with plunger 120 so that line L1, orthogonal to axis of rotation AR, passes through slider ring 116 and plunger 120; and slider ring 116 is arranged to block displacement of plunger 120 in radial direction RD2. To transition from the disconnect mode to the connect mode, slider ring 116 is arranged to displace hub 102 in axial direction AD2, for example via contact with plunger 114.

In an example embodiment, plunger 120 is axially located between surface 124 and surface 126 of hub 102. In an example embodiment, in the disconnect mode: surface 128 of slider ring 116 is radially aligned with surface 124 so that line L2, orthogonal to axis of rotation AR, passes through surfaces 124 and 128; line L1 passes through surface 130 of slider ring 116; and surface 130 is in contact with surface 132 of plunger 120. In an example embodiment, in the connect mode, surface 128 is in contact with surface 134 of plunger 114; surfaces 126 and 130 are radially aligned so that line L3, orthogonal to axis of rotation AR, passes through surfaces 126 and 130; and line L1 passes through surfaces 128 and 132.

In an example embodiment, radially outermost end E3 of plunger 120 includes surface 132 sloping radially outward in axial direction AD2; surface 130 slopes radially outward in axial direction AD2; and to transition from the disconnect mode to the connect mode, the actuator is arranged to slide surface 130 along surface 132 in axial direction AD2.

In an example embodiment, surfaces 130 and 132 are planar.

In the connect mode, plunger 120 is axially fixed, with respect to hub 108, with respect to displacement in axial direction AD1. In an example embodiment, in the connect mode, plunger 120 is axially fixed, with respect to hub 108, with respect to displacement in axial direction AD2. In the example embodiment of FIGS. 2 through 4, shaft 108 includes radially disposed bore 136 and plunger 120 is located in radially disposed bore 138 in hub 102. In the connect mode, slider ring 116 is arranged to displace plunger 120 in direction RD1 through bore 138 and into bore 136. Plunger 120 is substantially axially fixed to hub 102; therefore, the placement of plunger 120 in bore 138 blocks displacement of hub 102 in direction AD1 once plunger 120 contacts shaft 108.

Figure 5:
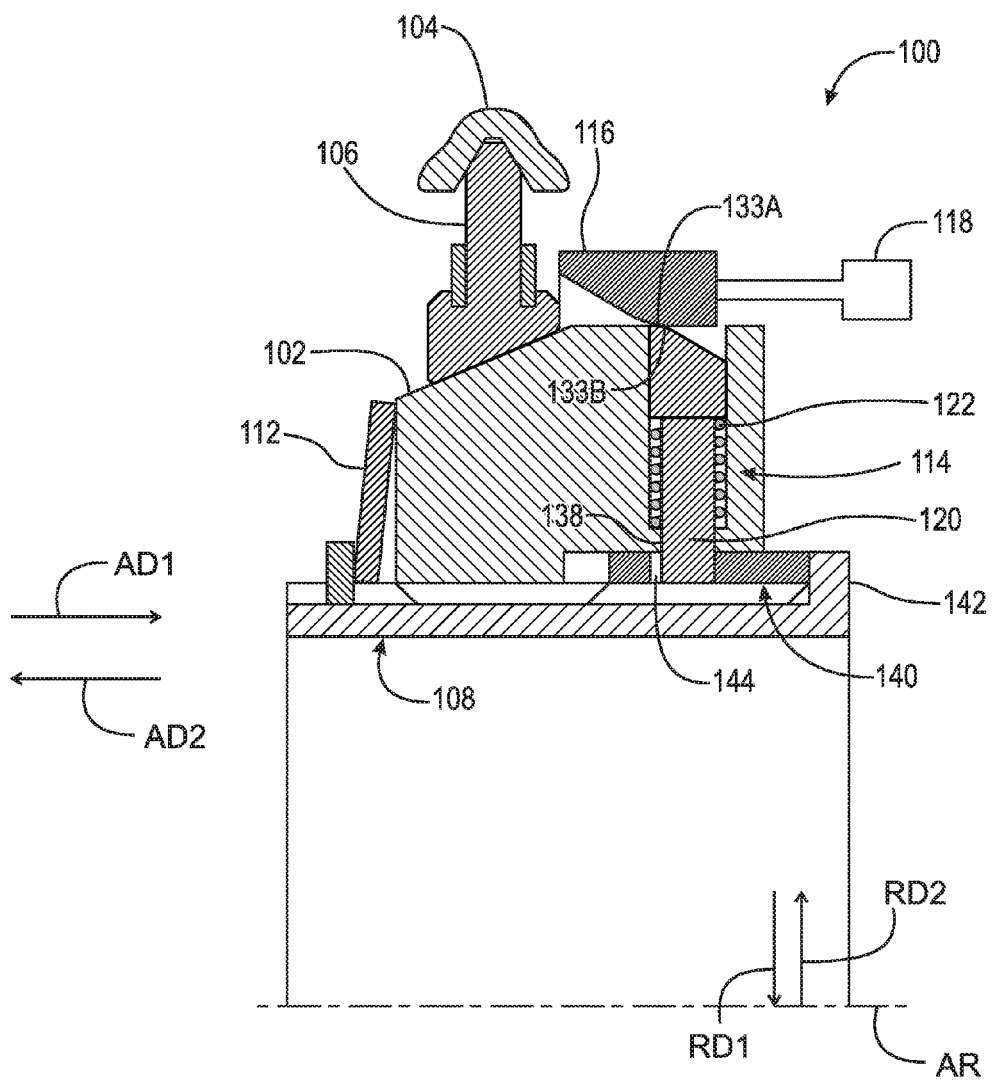
FIG. 5 is a partial cross-sectional view of a wedge clutch with a self-locking connect mode, in the connect mode.

FIG. 5 is a cross-sectional view of wedge clutch 100 with a self-locking connect mode and inner ring 140, in the connect mode.

Figure 6:
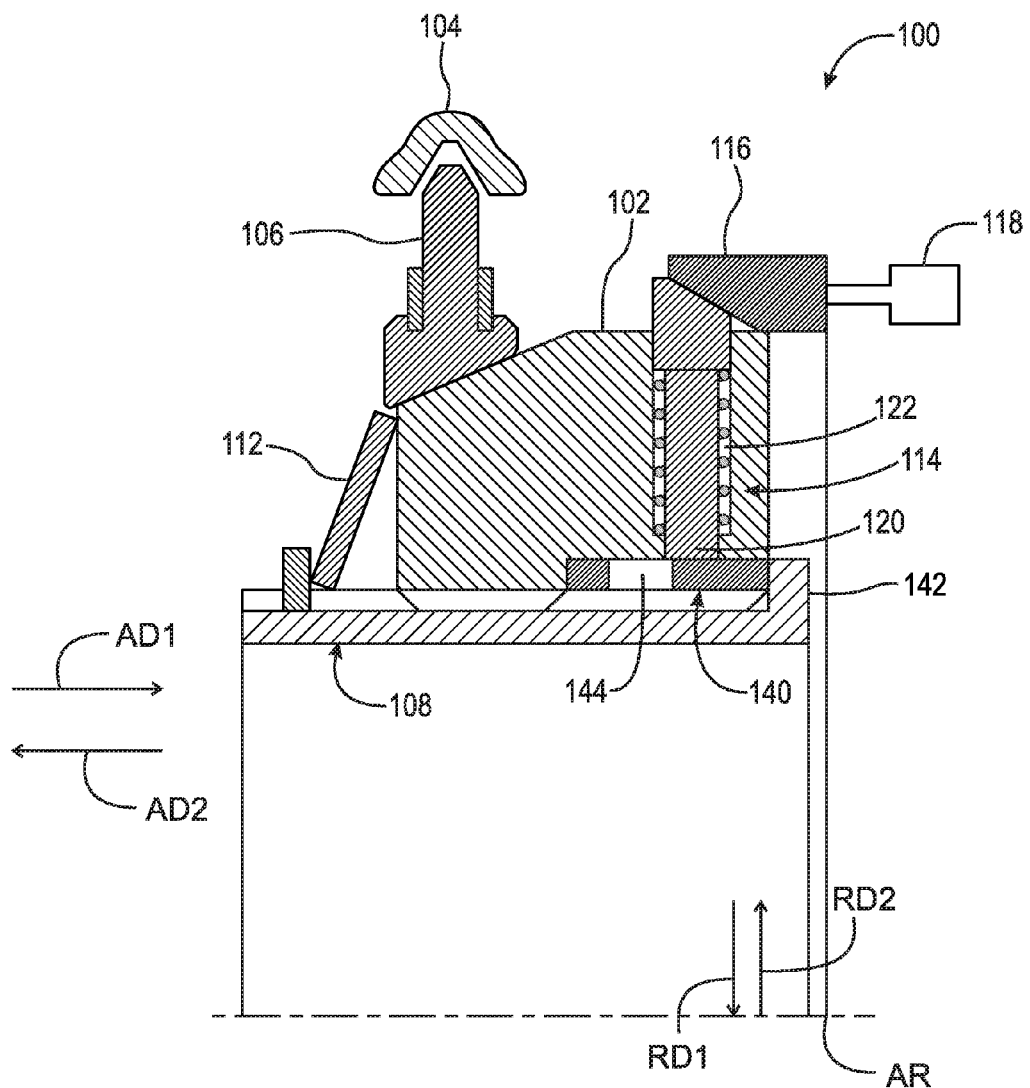
FIG. 6 is a partial cross-sectional view of the wedge clutch in FIG. 5 in a disconnect mode.

FIG. 6 is a partial cross-sectional view of wedge clutch 100 in FIG. 5 in the disconnect mode. The discussion for FIGS. 2 through 4 is applicable to FIGS. 5 and 6 except as noted below. In the connect mode, plunger 120 is axially fixed, with respect to hub 108, with respect to displacement in axial direction AD1. In the example embodiment of FIGS. 5 and 6, wedge clutch 100 includes inner ring 140 engaged with hub 108 so that axial stop 142 of hub 108 blocks movement of inner ring 140 in direction AD1. In an example embodiment, ring 140 is fixedly connected to hub 108. Ring 140 includes radially disposed bore 144 and plunger 120 is located in radially disposed bore 138 in hub 102. In the connect mode, slider ring 116 is arranged to displace plunger 120 in direction RD1 through bore 138 and into bore 144. Plunger 120 is substantially axially fixed to hub 102; therefore, the placement of plunger 120 in bore 144 blocks displacement of hub 102 in direction AD1 once plunger 120 contacts ring 140.

Figure 7:
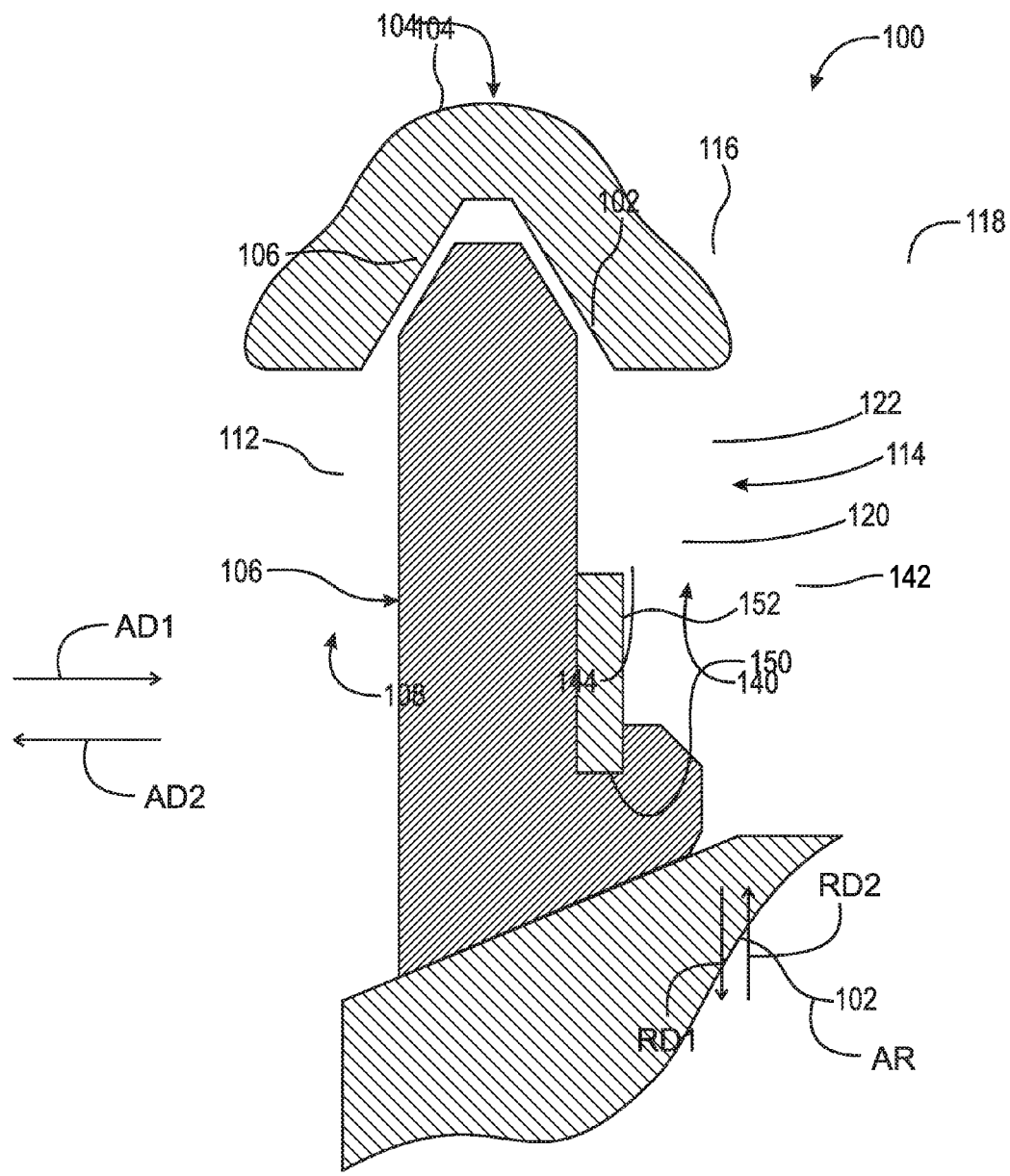
FIG. 7 is a detail of an example embodiment of the wedge plate in FIG. 2.

FIG. 7 is a detail of an example embodiment of wedge plate 106 in FIG. 2. The following should be viewed in light of FIGS. 2 through 7. In an example embodiment, wedge plate 106 includes segments 148. Each segment 148 is separately formed from the remaining segments 148. That is, each segment 148 is a separate distinct piece. In an example embodiment, each segment 148 includes circumferentially extending grooves 150 and 154 and wedge clutch 100 includes annular resilient elements (rings) 152 and 156 disposed in grooves 150 and 154, respectively, and urging segments 148 radially inward into contact with hub 102. In an example embodiment, each segment 148 includes only one of circumferentially extending grooves 150 and 154 and wedge clutch 100 includes only one of annular resilient elements (rings) 152 and 156 disposed in grooves 150 and 154, respectively. For example, in FIG. 7, plate 106 includes groove 150 and element 152 and not groove 154 and element 156.

Figure 8:
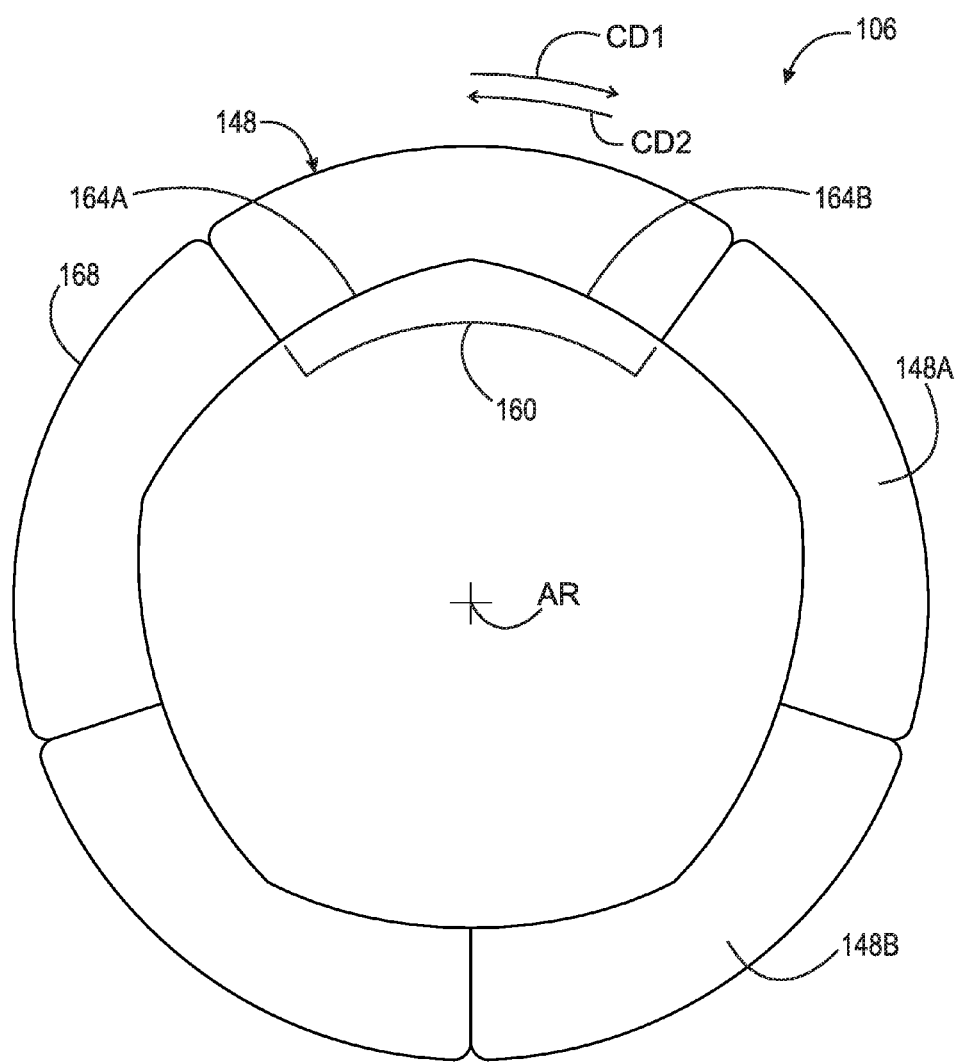
FIG. 8 is a front view of the wedge plate in FIG. 2.

FIG. 8 is a front view of wedge plate 106 in FIGS. 2 through 6. The following should be viewed in light of FIGS. 2 through 8. Segments 148 include circumferentially adjacent segments, for example, segments 148A and 148B. For example, to transition from the disconnect mode to the connect mode: segments 148A and 148B are arranged to displace radially outward and away from each other in direction CD1 or CD2. For example, to transition from the connect mode to the disconnect mode: segments 148A and 148B are arranged to displace radially inward and toward each other in direction CD1 or CD2.

In an example embodiment, in the disconnect mode: at least one segment 148 is in contact with a circumferentially adjacent segment 148. In an example embodiment, in the connect mode: at least one segment 148 is free of contact with a circumferentially adjacent segment 148.

Figure 9:
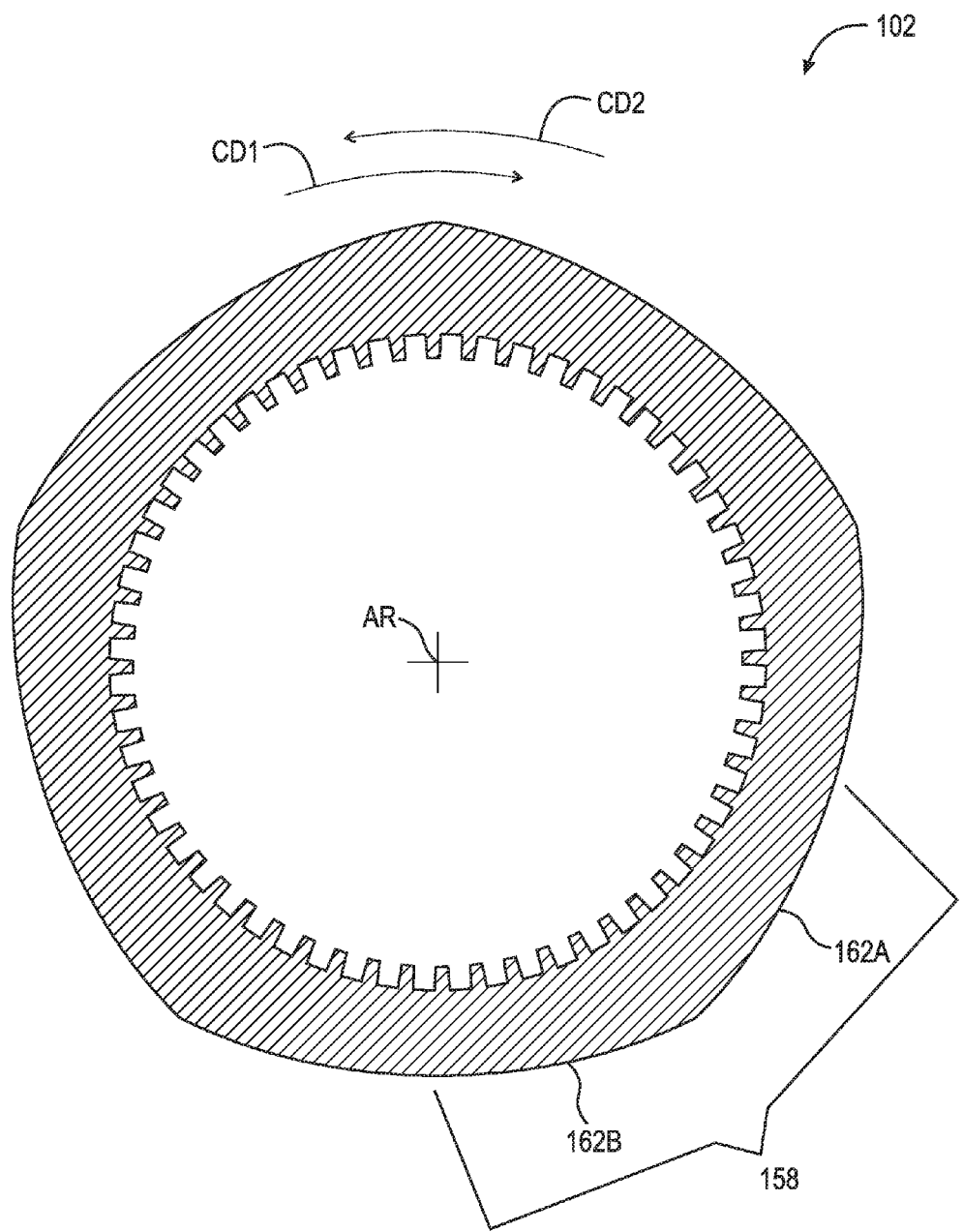
FIG. 9 is a cross-sectional view of the hub in FIG. 2, generally along line 9-9 in FIG. 2.

FIG. 9 is a cross-sectional view of hub 102 generally along line 9-9 in FIG. 2. The following should be viewed in light of FIG. 2 through 9. In an example embodiment: hub 102 includes ramps, for example, ramp pairs 158; and wedge plate 106 includes ramps, for example ramp pairs 160. Each ramp pair 158 includes ramp 162A extending radially outward in circumferential direction CD1 and ramp 162B extending radially outward in circumferential direction CD2. Each ramp pair 160 includes ramp 164A extending radially outward in circumferential direction CD1 and ramp 164B extending radially outward in circumferential direction CD2. Each ramp 162A is engaged with a respective ramp 164A. Each ramp 162B is engaged with a respective ramp 164B.

The following provides further detail regarding the structure and function of wedge clutch 100. Note that torque can be applied to: hub 102 for transmission to ring 104; or to ring 104 for transmission to hub 102. For example, to transition from the disconnect mode to the connect mode: torque is applied to hub 102 in direction CD1; actuator 118 displaces slider ring 116 in direction AD2; slider ring 116 pushes plunger 120 in direction RD1; and plunger 120 axially locks hub 102. As hub 102 displaces in direction AD2, wedge plate 106 slides radially outwardly along surface 166 of hub 102. Outer circumferential surfaces 168 of segments 148 frictionally engage inner circumferential surface 170 of ring 104. Hub 102 and wedge plate 106 are rotating relative to ring 104 in direction CD1. Therefore, the frictional engagement of plate 106 with ring 104 causes plate 106 to rotate with respect to hub 102, causing ramps 164A to slide radially outwardly (slide up or climb) along ramps 162A, which in turn causes wedge plate 106 to expand radially outward and non-rotatably connect to hub 102 and ring 104.

The respective slopes of surfaces 130 and 166 are determined such that as slider ring 116 pushes against surface 132, frictional forces prevent surface 132 from sliding radially inwardly along surface 130, and force from actuator 118 in direction AD2 displaces plunger 120 and hub 102 in direction AD2. Once wedge plate 106 begins to engage ring 106, the contact of ring 104 and 106 blocks further displacement of plunger 120 in direction AD2, and ring 116 forces plunger 120 radially inward.

To transition from the connect mode to the disconnect mode: torque is released from hub 102; actuator 118 displaces slider ring 116 in direction AD1; spring 122 pushes plunger 120 in direction RD2 and out of bore 136 or 144; and element 112 displaces hub 102 in axial direction AD1. Wedge plates 106 slides down surface 166, creating gaps 172. That is, pairs 160 slide down pairs 158. Since there is no contact between wedge plate 106 and ring 104, ring 104 and hub 102 are able to rotate independently of each other.

The discussion for torque applied in direction CD1 is applicable to torque applied in direction CD2. For example, to transition from the disconnect mode to the connect mode: torque is applied to hub 102 in direction CD1; actuator 118 displaces slider ring 116 in direction AD2; slider ring 116 pushes plunger 120 in direction RD1; and plunger 120 axially locks hub 102. As hub 102 displaces in direction AD2, wedge plate 106 slides radially outwardly along surface 166 of hub 102. Outer circumferential surfaces 168 of segments 138 frictionally engage inner circumferential surface 170 of ring 104. Hub 102 and wedge plate 106 are rotating relative to ring 104 in direction CD1. Therefore, the frictional engagement of plate 106 with ring 104 causes plate 106 to rotate with respect to hub 102, causing ramps 164B to slide radially outwardly (slide up or climb) along ramps 162B, which in turn causes wedge plate 106 to expand radially outward and non-rotatably connect to hub 102 and ring 104.

To transition from the connect mode to the disconnect mode: torque is released from hub 102; actuator 118 displaces slider ring 116 in direction AD1; spring 122 pushes plunger 120 in direction RD2 and out of bore 136 or 144; and element 112 displaces hub 102 in axial direction AD1. Wedge plates 106 slides down surface 166, creating gaps 172. That is, pairs 160 slide down pairs 158. Since there is no contact between wedge plate 106 and ring 104, ring 104 and hub 102 are able to rotate independently of each other.

Note that the above discussion regarding application of torque to hub 102 is applicable to application of torque to ring 104.

In an example embodiment, wedge clutch 100 includes a plurality of plungers 120 and springs 122, for example as shown in FIG. 2. It should be understood that clutch 100 is not limited to any particular number of plungers 120 and springs 122 or any particular circumferential configuration of plungers 120 and springs 122. In an example embodiment, hub 102 includes splines 174 non-rotatably connected to shaft 108.

Advantageously, wedge clutch 100 resolves the problem noted above of preventing a wedge clutch from slipping from a connect mode to a disconnect mode or of preventing a wedge clutch from slipping in the connect mode to reduce the torque-carrying capacity of the clutch. In particular, the disposition of plunger 120 in hub 102 and bore 136 or 144 prevents hub 102 from displacing in direction AD1 while in the connect mode. Further, it is not necessary to keep actuator 118 activated once in the connect mode. For example, in the connect mode, surface 134 of plunger 120 is pushed in direction RD2 into surface 128 of ring 116. There is virtually no force on ring 116 in direction AD1 from the contact of surfaces 128 and 134 and thus, there is no need to activate actuator 118 to counter a force on ring 116 in direction AD1. That is, virtually all of the force from spring 122 is directed radially outward into ring 116. Therefore, hub 102 is prevented from displacing in direction AD1 in the connect mode, which eliminates undesired opening of clutch 100 and loss of torque-carrying capacity for clutch 100. Further, the energy requirements for actuator 118 are reduced.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A wedge clutch, comprising:
   an axis of rotation;
   a shaft;
   a hub radially disposed about the shaft and including a first ramp extending radially outwardly in a first circumferential direction;
   an outer ring located radially outward of the hub;
   a wedge plate radially disposed between the hub and the outer ring and including a second ramp extending radially outwardly in the first circumferential direction and engaged with the first ramp; and,
   a displacement assembly including:
      a first element urging the hub in a first axial direction; and,
      a plunger assembly, at least a portion of which is disposed within the hub, wherein:
   to transition from a disconnect mode for the wedge clutch, in which the hub and the outer ring are rotatable with respect to each other, to a connect mode for the wedge clutch, in which the hub and the outer ring are non-rotatably connected:
      the displacement assembly is arranged to displace the hub in a second axial direction, opposite the first axial direction; and,
      at least a portion of the plunger assembly is arranged to displace radially inward, through the hub, in a first radial direction to block axial displacement of the hub in the first axial direction;
   to transition from the connect mode to the disconnect mode:
      the at least a portion of the plunger assembly is arranged to displace radially outward, through the hub, in a second radial direction, opposite the first radial direction; and,
      the first element is arranged to displace the hub in the first axial direction;
   the wedge plate includes a plurality of segments, each segment in the plurality of segments separately formed from remaining segments in the plurality of segments; and,
   each segment in the plurality of segments includes a respective circumferentially extending groove, the wedge clutch further comprising:
      an annular resilient element disposed in the respective circumferentially extending grooves and urging the plurality of segments radially inward, wherein:
   each segment in the plurality of segments includes a respective first plurality of ramps;
   the hub includes a second plurality of ramps engaged with the respective first pluralities of ramps; and,
   to transition from the disconnect mode to the connect mode, the respective first pluralities of ramps are arranged to slide radially outwardly along the second plurality of ramps, in a first circumferential direction.

2. The wedge clutch of claim 1, wherein the plunger assembly is non-rotatably connected to the hub.

3. The wedge clutch of claim 1, wherein:
   the displacement assembly includes:
      a slider ring radially disposed about at least a portion of the hub; and,
      an actuator;
   the plunger assembly includes a plunger, at least a part of which is disposed in the hub;

to transition from the disconnect mode to the connect mode:
the actuator is arranged to slide the slider ring along the plunger in the second axial direction; and,
the slider ring is arranged to displace the plunger in the first radial direction; and, in the connect mode:
the slider ring is radially aligned with the plunger so that a first line, orthogonal to the axis of rotation, passes through the slider ring and the plunger; and,
the slider ring is arranged to block displacement of the plunger in the second radial direction.

4. The wedge clutch of claim 3, wherein to transition from the disconnect mode to the connect mode the slider ring is arranged to displace the hub in the second axial direction.

5. The wedge clutch of claim 3, wherein:
the displacement assembly includes a spring
with a first end engaged with the hub and with a second end engaged with the plunger; and,
urging the plunger in the second radial direction; and,
to transition from the connect mode to the disconnect mode, the spring is arranged to displace the plunger in the second radial direction.

6. The wedge clutch of claim 3, wherein:
the plunger is axially located between first and second surfaces of the hub; and,
in the disconnect mode:
a first surface of the slider ring is radially aligned with the first surface of the hub so that a second line, orthogonal to the axis of rotation, passes through the first surface of the slider ring and the first surface of the hub; and,
the first line passes through a second surface of the slider ring.

7. The wedge clutch of claim 6, wherein:
in the disconnect mode, the second surface of the slider ring is in contact with the plunger; and,
in the connect mode, the first surface of the slider ring is in contact with the plunger.

8. The wedge clutch of claim 6, wherein in the connect mode:
the second surface of the slider ring is radially aligned with the second surface of the hub so that a third line, orthogonal to the axis of rotation, passes through the second surface of the slider ring and the second surface of the hub; and,
the first line passes through the first surface of the slider ring.

9. The wedge clutch of claim 6, wherein:
the plunger includes a radially outermost end including a third surface sloping radially outward in the second axial direction;
the second surface of the slider ring slopes radially outward in the second axial direction; and,
to transition from the disconnect mode to the connect mode, the actuator is arranged to slide the second surface of the slider ring along the third surface in the second axial direction.

10. The wedge clutch of claim 6, wherein:
the plunger includes a radially outermost end with a third surface sloping radially outward in the second axial direction;
the second surface of the slider ring slopes radially outward in the second axial direction; and,
in the disconnect mode, the second surface of the slider ring is in contact with the third surface.

11. The wedge clutch of claim 3, further comprising:
a second hub, wherein:
the hub is non-rotatably connected to the second hub; and,
in the connect mode, the plunger is axially fixed, with respect to the second hub, with respect to displacement in the first axial direction.

12. The wedge clutch of claim 11, wherein:
the second hub includes a radially disposed bore; and,
in the connect mode, the plunger is disposed in the radially disposed bore; or,
wherein:
the wedge clutch further comprises an inner ring radially disposed between the first and second hubs;
the inner ring includes a radially disposed bore; and,
in the connect mode, the plunger is disposed in the radially disposed bore.

13. The wedge clutch of claim 1, wherein the first element is a resilient element.

14. A wedge clutch, comprising:
an axis of rotation;
a hub including a bore bounded by the hub in a first axial direction and in a second axial direction opposite the first axial direction;
an outer ring located radially outward of the hub;
a wedge plate radially disposed between the hub and the outer ring; and,
a displacement assembly including:
a first element urging the hub in the first axial direction;
an actuator;
a slider ring; and,
a plunger assembly, including a plunger, at least a portion of which is disposed within the bore of the hub, wherein:
to transition from a disconnect mode for the wedge clutch, in which the hub and the outer ring are rotatable with respect to each other, to a connect mode for the wedge clutch, in which the hub and the outer ring are non-rotatably connected:
the actuator is arranged to displace the slider ring in the second axial direction;
the slider ring is arranged to displace the hub in the second axial direction; and,
the slider ring is arranged to displace the plunger radially inward, through the bore in the hub, in a first radial direction;
in the connect mode:
the slider ring is arranged to block displacement of the plunger radially outward in a second radial direction; and,
the plunger is arranged to block displacement of the hub in the first axial direction; and,
to transition from the connect mode to the disconnect mode:
the actuator is arranged to displace the slider ring in the first axial direction;
the plunger is arranged to displace radially outward, through the hub, in the second radial direction; and,
the first element is arranged to displace the hub in the first axial direction.

15. The wedge clutch of claim 14, wherein:
the plunger assembly includes a spring:
with a first end engaged with the hub and with a second end engaged with the plunger; and,
urging the plunger in the second radial direction; and,
to transition from the connect mode to the disconnect mode, the spring is arranged to displace the plunger in the second radial direction.

16. The wedge clutch of claim 14, further comprising:
a second hub, wherein:
the hub is non-rotatably connected to the second hub; and,
in the connect mode, the plunger is axially fixed, with respect to the second hub, with respect to displacement in the first axial direction.

17. The wedge clutch of claim 14, wherein:
the plunger includes a radially outermost end with a first surface sloping radially outward in the second axial direction;
the slider ring includes a second surface sloping radially outward in the second axial direction;
in the disconnect mode, the first surface is in contact with the second surface; and,
in the connect mode, the second surface is located past the plunger in the second axial direction.

18. A wedge clutch, comprising:
an axis of rotation;
a shaft;
a hub non-rotatably connect to the shaft and including a first ramp pair, the first ramp pair including:
a first ramp extending radially outward in a first circumferential direction; and,
a second ramp extending radially outward in a second circumferential direction opposite the first circumferential direction;
an outer ring located radially outward of the hub;
a wedge plate radially disposed between the hub and the outer ring and including a second ramp pair, the second ramp pair including:
a third ramp extending radially outward in the first circumferential direction and engaged with the first ramp; and,
a fourth ramp extending radially outward in the second circumferential direction and engaged with the second ramp; and,
a displacement assembly including:
a first element urging the hub in a first axial direction;
an actuator;
a slider ring radially disposed about at least a portion of the hub; and,
a plunger assembly including:
a plunger;
axially located between first and second surfaces of the hub; and,
at least a portion of which is disposed within the hub; and,
a spring urging the plunger radially outward, wherein:
to transition from a disconnect mode for the wedge clutch, in which the hub and the outer ring are rotatable with respect to each other, to a connect mode for the wedge clutch, in which the hub and the outer ring are non-rotatably connected:
the actuator is arranged to displace the slider ring along the plunger in a second axial direction, opposite the first axial direction;
the slider ring is arranged to displace the hub in the second axial direction; and,
the slider ring is arranged to displace the plunger radially inward, through the hub;
in the connect mode:
the slider ring is radially aligned with the plunger so that a first line, orthogonal to the axis of rotation, passes through the slider ring and the plunger;
the slider ring is arranged to block displacement of the plunger radially outward in a second radial direction; and,
the plunger is arranged to block displacement of the hub, with respect to the shaft, in the first axial direction;
in the disconnect mode:
a first surface of the slider ring is radially aligned with the first surface of the hub so that a second line, orthogonal to the axis of rotation, passes through the first surface of the slider ring and the first surface of the hub; and,
the first line passes through a second surface of the slider ring; and,
to transition from the connect mode to the disconnect mode:
the actuator is arranged to displace the slider ring in the first axial direction;
the spring is arranged to displace the plunger radially outward, through the hub; and,
the first element is arranged to displace the hub in the first axial direction.

* * * * *

UNITED STATES PATENT AND TRADEMARK OFFICE
CERTIFICATE OF CORRECTION

PATENT NO. : 9,816,567 B2  
APPLICATION NO. : 15/019571  
DATED : November 14, 2017  
INVENTOR(S) : Ince et al.

Page 1 of 1

It is certified that error appears in the above-identified patent and that said Letters Patent is hereby corrected as shown below:

In the Claims

Column 9, Line 67, "a second hub" should be --an other hub--

Column 10, Line 1, "the second hub" should be --the other hub--

Column 10, Line 4, "the second hub" should be --the other hub--

Column 10, Line 8, "the second hub" should be --the other hub--

Column 10, Line 13, "the first and second hubs" should be --the hub and the other hub--

Column 11, Line 2, "a second hub" should be --an other hub--

Column 11, Line 3, "the second hub" should be --the other hub--

Column 11, Line 6, "the second hub" should be --the other hub--

Signed and Sealed this  
Third Day of March, 2020

Andrei Iancu  
*Director of the United States Patent and Trademark Office*